Patented July 30, 1935

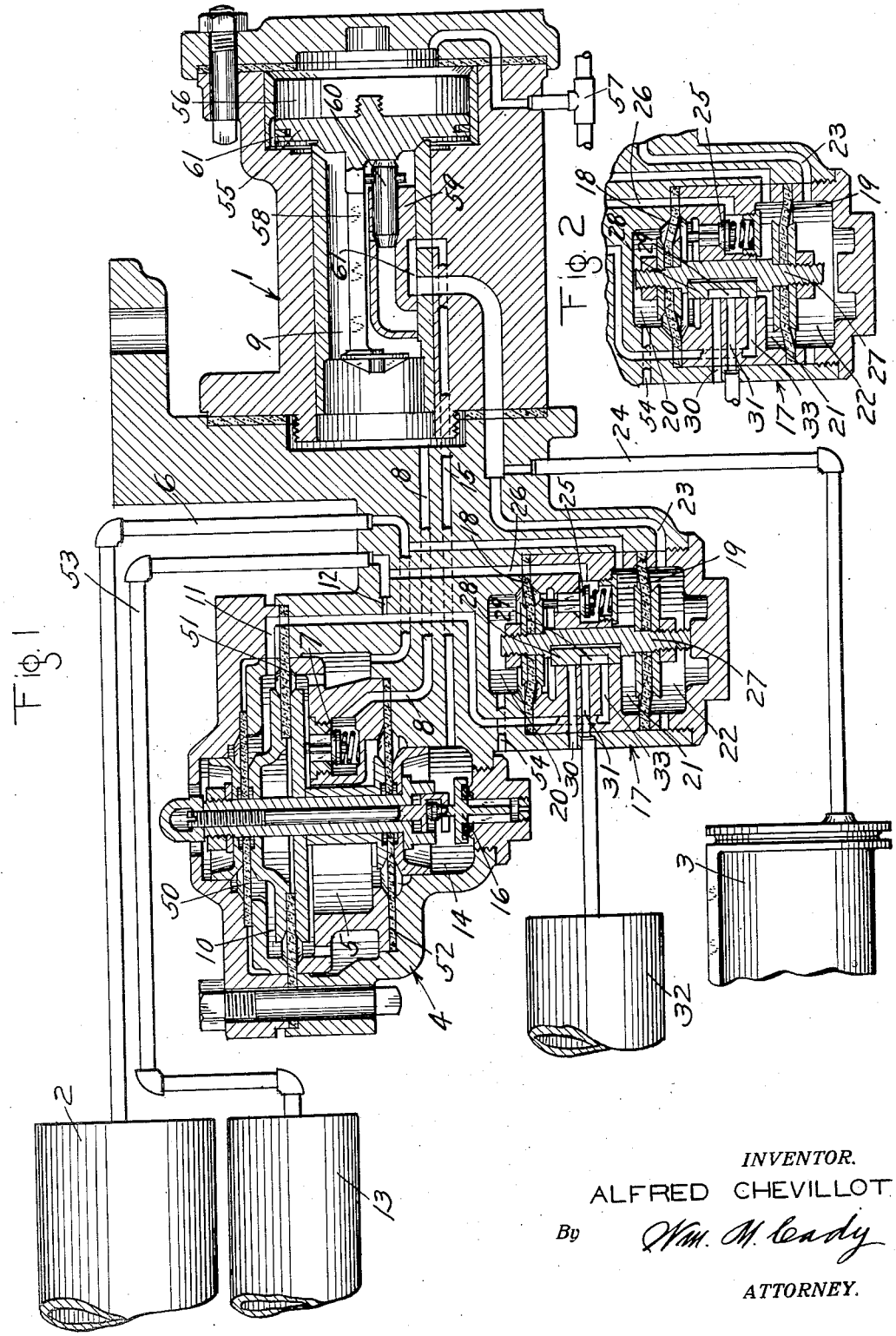

2,009,836

UNITED STATES PATENT OFFICE 2,009,836

FLUID PRESSURE BRAKING APPARATUS

Alfred Chevillot, Gargan Livry, France, assignor to The Westinghouse Air Brake Company, Wilmerding, Pa., a corporation of Pennsylvania Application August 20, 1932, Serial No. 629,596
In France December 23, 1931

6 Claims. (Cl. 303—74)

This invention relates to fluid pressure braking apparatus of the kind in which the supply of fluid under pressure to and its release from the brake cylinder of the apparatus is arranged to be controlled in accordance with variations in brake pipe pressure by means of a controlling valve device, adapted to effect a graduated release of the brakes in accordance with the degree of restoration of brake pipe and auxiliary reservoir pressure towards the pressure obtaining in a control chamber or reservoir containing fluid under pressure.

The invention has for its object to provide an improved form of braking apparatus of the character above indicated.

As hitherto constructed the pressure in the control chamber of the apparatus is arranged to be maintained substantially constant, the graduated release of the brakes being controlled by the cooperating pressures in the control chamber, the auxiliary reservoir or brake pipe and the brake cylinder in such a manner that the two latter pressures act in opposition to the control chamber pressure so that an increase in the auxiliary reservoir or brake pipe pressure due to a restoration of brake pipe pressure effects the release of fluid from the brake cylinder until equilibrium is again established between the combined auxiliary reservoir and brake cylinder pressures and the opposing control chamber pressure.

In the usual type of triple or distributing valve the auxiliary reservoir pressure is during an application of the brakes reduced to an extent dependent only upon the reduction effected in brake pipe pressure so that the resultant brake cylinder pressure will depend upon the travel or stroke of the brake piston and may consequently be different on different vehicles. The brake cylinder pressure cooperating with the auxiliary reservoir or brake pipe pressure during a graduated release of the brakes will thus be variable and this tends to prevent the release of the brakes from being uniformly effected throughout the length of the train.

According to the principal feature of the invention, this disadvantage is avoided by causing the pressure obtaining in the control chamber to be automatically adjusted to such a value that when the auxiliary reservoir or brake pipe pressure is restored towards its normal value during a graduated release of the brakes the auxiliary reservoir or brake pipe pressure at which the equilibrium is established as above explained will be independent of the brake cylinder pressure and the graduated release of the brakes will thus be uniformly and simultaneously effected on all the vehicles of the train regardless of differences or variations in the extent of the brake piston travel.

According to a further feature of the invention, the final release of fluid under pressure from the brake cylinder towards the end of the graduated release action is arranged to be effected by reducing the control chamber pressure at this stage so as to ensure the graduated release valve being opened and remaining open, this being preferably effected by establishing communication between the control chamber and a special reservoir or chamber normally containing fluid at atmospheric pressure.

The invention is illustrated by way of example in the accompanying drawing of which Fig. 1 is a diagrammatic sectional view of one form of apparatus embodying the invention, the parts being shown in their running and release positions.

Fig. 2 is a view of the auxiliary control valve device shown in Fig. 1 with the parts as positioned during an application of the brakes.

Referring now to the drawing, it will be seen that the apparatus comprises a triple or distributing valve 1 of the usual construction, an auxiliary reservoir 2 and brake cylinder 3, the triple valve 1 being adapted to co-operate with a graduated release valve device 4. The graduated valve device 4 is internally divided into a number of compartments by means of flexible diaphragms 50, 51 and 52, the middle compartment 5 being in open communication through a pipe 6 with the auxiliary reservoir 2 and communicating through a spring controlled valve 7 and a passage 8 with the valve chamber 9 of the triple valve 1. The upper compartment 10 of the graduated release valve device 4 communicates through a passage 11 and a restricted aperture 12 with a control reservoir 13 by way of pipe 53, while the lower compartment 14 communicates through a passage 15 with the exhaust port of the triple valve 1, communication between the compartment 14 and the atmosphere being controlled by the valve 16 of the graduated release valve device 4.

The apparatus also comprises an auxiliary control valve device 17 comprising a casing divided internally into three compartments by means of flexible diaphragms 18, 19, the upper compartment 20 of which is in open communication with the atmosphere by way of passage 54. The middle compartment 21 is in permanent communication with the pipe 6 leading to the auxiliary reservoir 2 while the lower compartment 22 communicates by means of a passage 23 with the pipe 24 leading to the brake cylinder 3. A spring controlled valve 25 is provided controlling communication between the middle compartment 21 and a passage 26 leading to the control reservoir 13, the valve 25 being adapted to be opened by the action of the diaphragm 18 as will be hereinafter described.

The diaphragms 18, 19 are provided with a stem 27 adapted to actuate a slide valve 28 having a cavity 29, the seat of the slide valve being provided with three ports of which the port 30 leads to the atmosphere, the port 31 leads to a special reservoir 32, and the port 33 leads to the passage 11.

The triple valve is as above stated of well known construction comprising a piston 55, contained in piston chamber 56, which chamber is connected to the brake pipe 57. The piston 55 is provided with a piston stem 58 for operating a slide valve 59 and a graduating valve 60 contained in valve chamber 9.

Under running conditions as shown in Fig. 1, the auxiliary reservoir 2 is charged with fluid from the brake pipe by way of the usual feed groove 61 to the valve chamber 9 and thence through passage 8 past the open valve 7, chamber 5 of the graduated release valve device 4 and pipe 6. Owing to the fact that the middle compartment 21 of the auxiliary valve device 17 contains fluid at auxiliary reservoir pressure supplied thereto through the pipe 6, the diaphragms 18, 19 and the slide valve 28 of the auxiliary valve device 17 occupy the position shown in Fig. 1, the lower compartment 22 being at atmospheric pressure since the brake cylinder 3 has been vented to the atmosphere.

Fluid at auxiliary reservoir pressure is under these conditions supplied from the compartment 21 past the open valve 25 through the pipe 26 to the control chamber 13, the upper compartment 10 of the graduated release valve device 4 being also supplied with fluid at the same pressure by way of the restricted port 12 and passage 11.

The special reservoir 32 in this position of the slide valve 28 is in communication with the passage 11 by way of cavity 29 and ports 31 and 33 so that the auxiliary reservoir 2, the control reservoir 13 and the special reservoir 32 all contain fluid at the normal pressure obtaining in the brake pipe of the apparatus.

When an application of the brakes is effected by reducing the brake pipe pressure in the usual manner the triple valve moves to application position, thereby effecting the supply of fluid from the auxiliary reservoir 2 to the brake cylinder.

As the pressure in the brake cylinder 3 rises, the pressure in the compartment 22 of the auxiliary valve device 17 is correspondingly increased and as the auxiliary reservoir pressure is being reduced by flow of fluid to the brake cylinder, the diaphragms 18, 19 will move upwards to a position permitting the valve 25 to seat.

The closure of the valve 25 will evidently cut off communication between the auxiliary reservoir 2 and the control reservoir 13, but until the valve 25 closes, communication is maintained between the auxiliary and control reservoirs so that when the valve 25 ultimately closes, the pressure in the control reservoir 13 will be the auxiliary reservoir pressure as reduced by flow to the brake cylinder and will thus be less than the original control reservoir pressure. The closure of the valve 25 being effected by the opposing pressures in the compartments 22 and 21 of the auxiliary valve device 17, will evidently occur when a predetermined relation is established between the brake cylinder and auxiliary reservoir pressures and will thus depend upon the pressure established in the brake cylinder 3 by the flow of fluid thereto from the auxiliary reservoir 2. This brake cylinder pressure will evidently depend upon the extent of travel of the brake cylinder piston, and the pressure established in the control chamber 13 will thus also depend upon the extent of this travel or stroke and since the pressure in the control reservoir 13 effects the operation of the graduated release valve device 4, the restoration of the auxiliary reservoir pressure to a predetermined extent during a graduated release of the brakes will effect this release independently of the pressure actually obtaining within the brake cylinder of an individual vehicle so that the graduated release will be properly effected regardless of the travel of the brake cylinder piston and will therefore occur uniformly throughout all the vehicles of the train.

It will be understood that at the end of the braking application the diaphragms 18, 19 and the slide valve 28 have been moved by the rise in brake cylinder pressure to the position shown in Fig. 2, in which communication is established between the special reservoir 32 and the atmosphere by way of port 31, cavity 29 and port 30, so that the special reservoir 32 is at atmospheric pressure when the graduated release of the brakes is commenced.

As the graduated release of the brakes is continued, the brake cylinder pressure obtaining in the chamber 22 of the auxiliary valve device 17 will be correspondingly reduced until towards the end of the releasing operation the slide valve 28 moves to its lower position, as shown in Fig. 1 and establishes communication between the control reservoir 13 and the special reservoir 32 by way of cavity 29 and the ports 31 and 33.

As a result, the pressure in the compartment 10 of the graduated release valve device is considerably reduced by flow of fluid into the special reservoir 32, which was previously at atmospheric pressure, and the release valve 16 is consequently fully opened and effects the final release of fluid from the brake cylinder 3.

In a modified construction, the compartment 22 of the auxiliary valve device 17 instead of communicating directly with the brake cylinder 3, as in the construction above described, may be arranged to communicate with the annular space 35 above the piston of the regulating valve 34.

The invention is evidently not limited to the particular constructional arrangements above described and illustrated which may be modified in various respects without exceeding the scope of the invention.

Having now described my invention, what I claim as new and desire to secure by Letters Patent, is:

1. In a fluid pressure brake, the combination with a brake pipe, auxiliary reservoir, brake cylinder, and a brake controlling valve device controlled by variations in brake pipe pressure for effecting the supply of fluid under pressure to and its release from the brake cylinder, of a control reservoir normally charged with fluid under pressure from the auxiliary reservoir, a valve device subject to the pressure in the control reservoir for controlling the graduated release of fluid from the brake cylinder, and means subject to brake cylinder pressure for controlling communication from the auxiliary reservoir to the control reservoir.

2. In a fluid pressure brake, the combination with a brake pipe, auxiliary reservoir, brake cylinder, and a brake controlling valve device controlled by variations in brake pipe pressure for effecting the supply of fluid under pressure to and its release from the brake cylinder, of a control reservoir normally charged with fluid under pressure from the auxiliary reservoir, a valve device subject to the pressure in the control reservoir for controlling the graduated release of fluid from the brake cylinder, a valve controlling communication from the auxiliary reservoir to the control reservoir, means subject to the opposing pressures of the auxiliary reservoir and the brake cylinder for normally maintaining said valve open, said means being operated upon the creation of a predetermined pressure relation between the auxiliary reservoir and the brake cylinder, to permit said valve to close.

3. In a fluid pressure brake, the combination with a brake pipe, auxiliary reservoir, brake cylinder, and a brake controlling valve device controlled by variations in brake pipe pressure for effecting the supply of fluid under pressure to and its release from the brake cylinder, of a control reservoir normally charged with fluid under pressure from the auxiliary reservoir, a valve device subject to the pressure in the control reservoir for controlling the graduated release of fluid from the brake cylinder, a valve controlling communication from the auxiliary reservoir to the control reservoir, means subject to the opposing pressures of the auxiliary reservoir and the brake cylinder for normally maintaining said valve open, said means being operated upon an increase in brake cylinder pressure to permit said valve to close.

4. In a fluid pressure brake, the combination with a brake pipe, auxiliary reservoir, brake cylinder, and brake controlling valve device controlled by variations in brake pipe pressure for effecting the supply of fluid under pressure to and its release from the brake cylinder, of a control reservoir normally charged with fluid under pressure from the auxiliary reservoir, a valve device subject to the pressure in the control reservoir for controlling the graduated release of fluid from the brake cylinder, a valve biased to closed position and controlling communication from the auxiliary reservoir to the control reservoir, means subject to the opposing pressures of the auxiliary reservoir and the brake cylinder for normally holding said valve open, said means being operated upon the creation of a predetermined pressure relation between the auxiliary reservoir and the brake cylinder pressures to permit said valve to close.

5. In a fluid pressure brake, the combination with a brake pipe, auxiliary reservoir, brake cylinder, and a brake controlling valve device controlled by variations in brake pipe pressure for effecting the supply of fluid under pressure to and its release from the brake cylinder, of a control reservoir normally charged with fluid under pressure from the auxiliary reservoir, a valve device subject to the pressure in the control reservoir for controlling the graduated release of fluid from the brake cylinder, and a valve mechanism operated upon a predetermined reduction in pressure in the brake cylinder in releasing the brakes for effecting a reduction in pressure in the control reservoir.

6. In a fluid pressure brake, the combination with a brake pipe, auxiliary reservoir, brake cylinder, and a brake controlling valve device controlled by variations in brake pipe pressure for effecting the supply of fluid under pressure to and its release from the brake cylinder, of a control reservoir normally charged with fluid under pressure from the auxiliary reservoir, a valve device subject to the pressure in the control reservoir for controlling the graduated release of fluid from the brake cylinder, a reduction reservoir, and a valve mechanism normally connecting said reduction reservoir to the control reservoir and operated upon an increase in brake cylinder pressure in applying the brakes to release fluid under pressure from the reduction reservoir and operative upon a reduction in brake cylinder pressure in releasing the brakes to connect said reduction reservoir to the control reservoir, so as to effect a reduction in pressure in the control reservoir.

ALFRED CHEVILLOT.